United States Patent [19]

Gutleber

[11] Patent Number: 4,498,083

[45] Date of Patent: Feb. 5, 1985

[54] MULTIPLE INTERFERENCE NULL TRACKING ARRAY ANTENNA

[75] Inventor: Frank S. Gutleber, Little Silver, N.J.

[73] Assignee: The United States of America as represented by the Secretary of the Army, Washington, D.C.

[21] Appl. No.: 480,533

[22] Filed: Mar. 30, 1983

[51] Int. Cl.³ .......................... G01S 3/16; G01S 3/28

[52] U.S. Cl. .................................... 343/380; 343/383

[58] Field of Search ................ 343/379, 380, 383, 844

[56] References Cited

U.S. PATENT DOCUMENTS 3,130,410 4/1964 Gutleber .

4,217,586 8/1980 McCuffin .......................... 343/380

*Primary Examiner*—Eli Lieberman

*Attorney, Agent, or Firm*—Anthony T. Lane; Michael Zelenka; Jeremiah G. Murray

[57] ABSTRACT

Multiple interference sources are independently acquired, tracked and cancelled in a multi-element antenna array where the number of antenna elements n is an integer power of the base 2, i.e. $n=2^M$ where M is the number of sources desired to be cancelled. The antenna elements are selectively coupled to sets of n/2 phase shifters in respective closed loop control circuits and operate in phase controlled sets, one for each interference source. The phase of the received signal incident on one half of the elements in each set is independently adjusted relative to the other half, for each desired null in a separate control loop, such that for a particular interfering source each antenna element of the set has one corresponding neighboring element in a pair of elements whose phase mutually differs by 180° at the space angle of the arrival of the interference wavefront relative to the axis of the antenna. This produces a substantially infinite null in the direction of arrival of the particular interfering wavefront and thus complete cancellation of that interfering source is effected. This null is retained as other interfering sources are independently acquired, nulled and tracked by a respective different set of n/2 elements in the same array.

15 Claims, 4 Drawing Figures

MULTIPLE INTERFERENCE NULL TRACKING ARRAY ANTENNA

The invention described herein may be manufactured and used by or for the Government for governmental purposes without the payment of any royalties thereon or therefor.

CROSS REFERENCE TO RELATED APPLICATION

This invention is related to U.S. Ser. No. 472,793, entitled, "Adaptive Multiple Interference Tracking and Cancelling Antenna", filed in the name of Frank S. Gutleber on Mar. 7, 1983.

FIELD OF THE INVENTION

This invention relates generally to antenna systems for radio transmission systems and more particularly to an array antenna which is adapted to independently and simultaneously track and cancel interference signals from multiple sources.

BACKGROUND OF THE INVENTION

As is well known, one of the major concerns of tactical communications systems is the elimination or reduction of external interference sources, such as jamming, selfinterference, atmospheric noise, man made noise, etc. One known technique for eliminating multiple interference comprises the system disclosed in the above referenced related application wherein a plurality of elements in an array antenna have predetermined space code positions adaptively varied by means of null tracking loops which are operable to vary the code positions of one half the elements in a set of elements relative to the other half to provide a predetermined 180° phase difference therebetween at the space angle of the arrival of each interference signal whereby a null and substantially complete cancellation of the interfering source is provided while retaining the ability to receive a desired signal at its peak received value. That invention is based upon the concept of spacing a particular number of individual antennas relative to one another for controlling the null positions of the desired antenna pattern which was disclosed in U.S. Pat. No. 3,130,410, entitled, "Space Coded Linear Array Antenna", issued to Frank S. Gutleber on Apr. 21, 1964, wherein there are illustrated array antennas which involve positioning a second element for each existing element in a space position that results in 180° phase difference between each pair of elements for a specific value of space angle of transmitted or received energy where the space angle is defined as the angle between the axis of the antenna and the wavefront of the radiation transmitted or received.

SUMMARY

Therefore, it is an object of the present invention to provide an array antenna which adaptively tracks and simultaneously cancels signals received from one or more undesired sources, such as interference sources.

It is another object of the present invention to provide an array antenna whereby a number of separate stationary or mobile interfering sources can be independently tracked and nulled while retaining the desired signal near its peak level.

It is still another object of the present invention to provide an array antenna capable of tracking and cancelling a plurality of independent moving interferers in angular space relative to the axis of the array.

It is yet another object of the invention to provide an array antenna which can not only adaptively track and simultaneously cancel interference from one or more undesired sources, but also from friendly sources using the same frequency bands.

Briefly, these and other objects are accomplished by means of an array antenna comprised of n individual linearly arranged antenna elements where $n=2^M$, and M is the number of interfering sources to be independently acquired, nulled and tracked. M sets of n/2 phase shifters are selectively coupled to the antenna elements such that each set is selectively coupled to a set of n/2 antenna elements to provide a predetermined 180° phase difference between the other n/2 elements at the space angle of arrival of each interference signal relative to the axis of the array. The phase difference is controlled by means of M null tracking loops which are operable to control respective sets of phase shifters whereby acquisition, tracking and cancellation of each interfering source is provided while retaining the ability to receive a desired signal near its peak received value.

DESCRIPTION OF THE PREFERRED EMBODIMENTS

Figure 1:
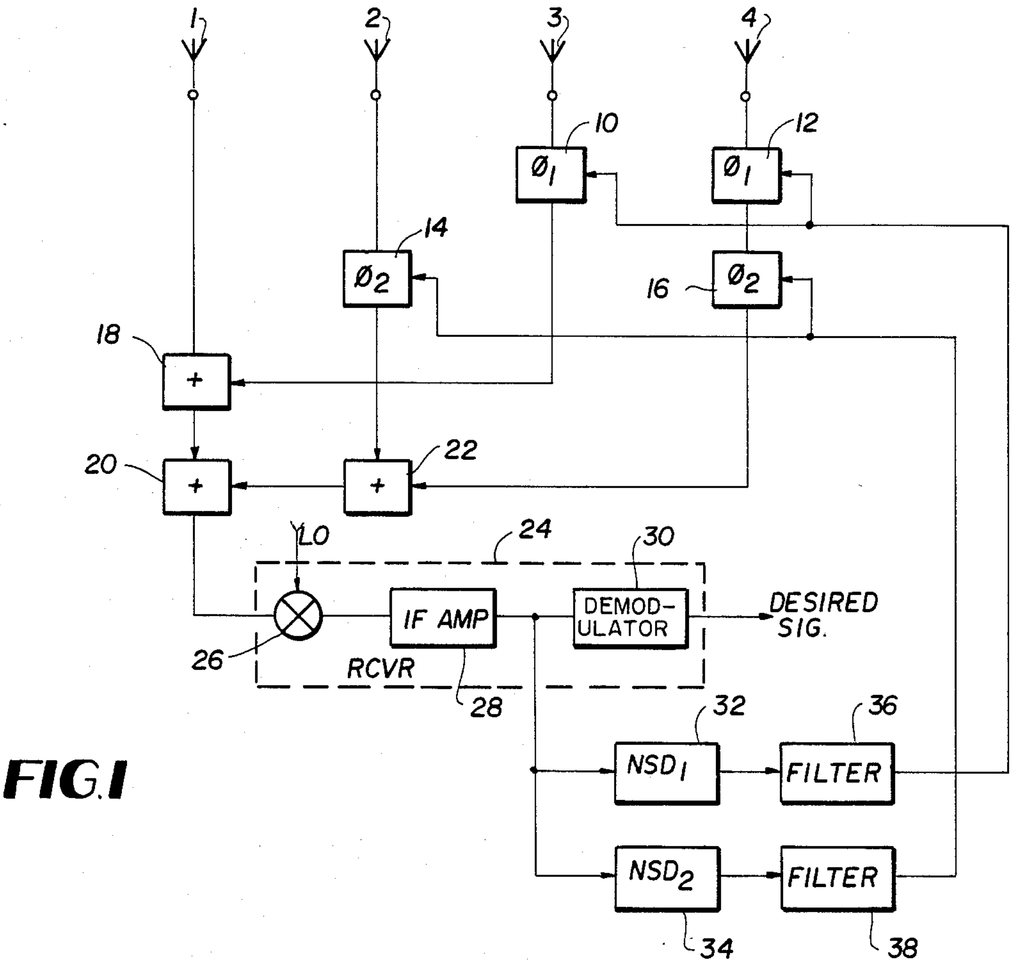
FIG. 1 is a functional block diagram illustrative of a four element array antenna in accordance with the subject invention.

Referring now to the drawings and more particularly to FIG. 1, shown thereat is a four element array antenna including linearly arranged antenna elements 1, 2, 3 and 4. Further, as shown, elements 3 and 4 are coupled to a first set of phase shifters 10 and 12 which are operable to shift the phase of signals received by elements 3 and 4 relative to elements 1 and 2. A second set of phase shifters 14 and 16 are coupled to elements 2 and 4 for shifting the phase of signals received by elements 2 and 4 relative to elements 1 and 3. The signals received by element 1 are not shifted. The signals received by the four antenna elements are combined i.e. summed by means of three adder circuits 18, 20 and 22 to provide a composite RF signal which is coupled to a radio communication receiver 24. As shown, for purposes of illustration, the adder circuit 18 is coupled to antenna elements 1 and 3 while the adder circuit 22 is coupled to elements 2 and 4 and adder circuit 20 is adapted to combine the intermediate outputs of adders 18 and 22.

The communications receiver 24 is shown including a signal mixer 26 which is adapted to receive, in addition to the RF output from the adder 20, a local oscillator signal (LO) for generating an IF signal which is coupled to an IF amplifier 28. The output of the IF amplifier 28 comprises an IF signal including both the desired signal and any undesired signal which may be, for example, an interference signal. The IF signal is next fed to demodulator circuit 30 which is operable to provide as an output the desired signal; however, the IF signal is additionally fed to one or more, in this instance, two null seeker detector circuits 32 and 34 which are respectively coupled to two sets of electrically controlled phase shifters 10, 12 and 14, 16 by way of respective filter circuit means 36 and 38 for closing two separate servo type control loops. The output of the first null seeking detector 32 comprises a first closed loop control signal for varying the phase $\phi_1$ of phase shifters 10 and 12 in response to the first interference signal arriving at a space angle $\theta_1$. The space angle $\theta_1$ is the angle between the direction of the interference signal wavefront and the perpendicular to the axis of antenna array. This assumes, however, that the elements 1, 2, 3 and 4 are arranged in a linear configuration. The null seeking detector 32 responds to a first interference signal received by the array antenna to change the phase of the signals received by elements 3 and 4 through the operation of the phase shifters 10 and 12 until they differ in phase by 180° relative to the phase of the interference signal received by elements 1 and 2 whereupon a cancellation of the first interference occurs and a null output is provided by the null seeking detector 32. The null seeking detector 32, moreover, will operate to continuously control the phase shifters 10 and 12 to maintain the desired 180° phase shift. Thus a first tracking loop is provided to locate, null and track one interfering source.

In the event a second interfering source is present, the second null seeking detector 34 responds to cause phase shifters 14 and 16 to alter the phase $\phi_2$ of the second interference signals received by elements 2 and 4 to differ in phase by 180° relative to the signals received at elements 1 and 3 for a space angle $\theta_2$ which is the angle of arrival of the wavefront of the second source of interference signals. In the same manner as before, the null seeking detector 34 effects a closed loop control of the phase shifters 14 and 16 to acquire, track and cancel the second received interference signal. Assuming that there are only two interference signals incident on the elements 1, 2, 3 and 4, and arriving at space angles $\theta_1$ and $\theta_2$ respectively, the embodiment of FIG. 1 will operate to independently acquire, track and completely cancel both interference signals.

It can be seen that the number of antenna elements is an integer of power of the base 2. Furthermore, the exponent defines the number of interference sources that can be cancelled. Thus, where n is the number of elements in the array; $n=2^M$, where M is the number of interference sources to be cancelled as well as the number of control loops and phase shifter sets of n/2 phase shifters that are required in the system.

Figure 2:
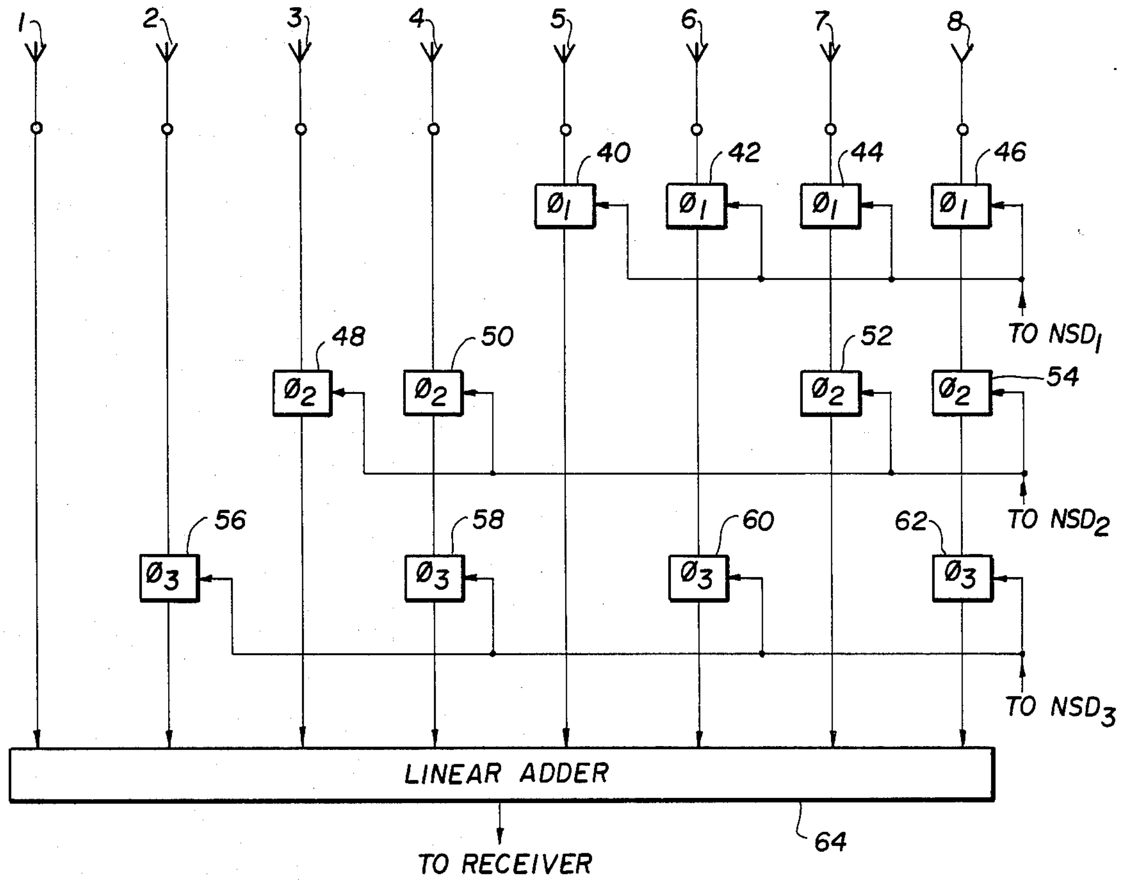
FIG. 2 is a functional block diagram illustrative of an eight element array antenna in accordance with the subject invention.

The inventive concept is further illustrated in FIG. 2 where an eight element linear array is shown coupled to three sets of phase shifters which are included in three separate null tracking loops of the type shown in FIG. 1. In FIG. 2, a first set of phase shifters 40, 42, 44 and 46 are coupled to antenna elements 5, 6, 7 and 8, respectively, to provide a first phase shift $\phi_1$ relative to signals received by elements 1, 2, 3 and 4 to track a first interference signal having a space angle of arrrival of $\theta_1$. A second set of phase shifters 48, 50, 52 and 54 are respectively connected to antenna elements 3, 4, 7 and 8 to effect a phase shift $\phi_2$ of a second interference signal received relative to antenna elements 1, 2, 5 and 6 and where the second interference signal has a space angle of arrival at the array of $\theta_2$. The eight element array of FIG. 2 is additionally capable of tracking a third interference signal by the inclusion of a third set of phase shifters 56, 58, 60 and 62 which are respectively connected to elements 2, 4, 6 and 8, and which are operable to shift the phase of the interference signal received by elements 2, 4, 6 and 8 by an amount $\phi_3$ relative to elements 1, 3, 5 and 7. All of the antenna elements are coupled through the various phase shifters, with the exception of element 1, to a linear adder 64 which is adapted to generate and couple a composite RF signal of not only the desired signal, but any interference signals which may be present to a receiver such as shown in FIG. 1. Since three sets of phase shifters are employed for an eight element array, three null seeking detectors of the type shown in FIG. 1 and coupled to the receiver would be utilized in three separate control loops to track and cancel three separate interference signals. Were a fourth interference signal to be cancelled, the linear array would have to be enlarged to a 16 element array. Thereafter, each doubling of elements would provide an additional means of implementing an independent null tracking loop.

Although separate phase shifters are shown in FIGS. 1 and 2 connected in series, for example, phase shifters 12 and 16 are connected to element 4 in FIG. 1 and phase shifters 46, 54 and 62 are connected to element 8 in FIG. 2; when desirable, a single phase shifter for each antenna element could be employed with a composite control voltage being generated from the respective control loops being combined in an analog or digital adder prior to being applied to the specific phase shifter. Separate phase shifters have been shown and described herein so that the principle of operation of the invention can more readily be seen.

Figure 3:
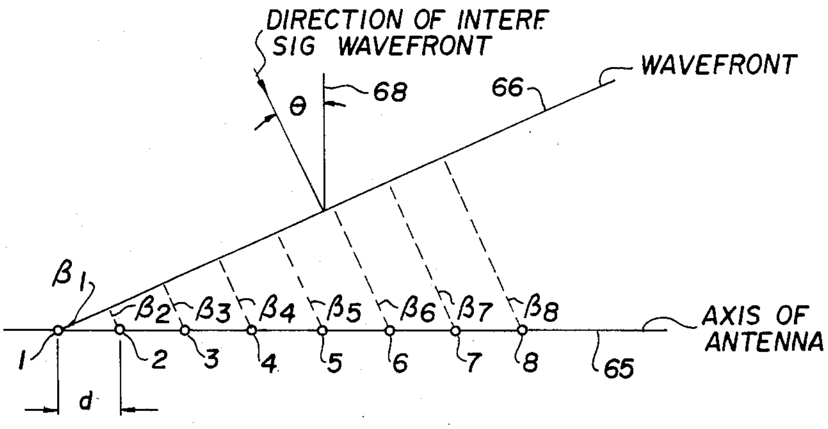
FIG. 3 is a diagram illustrating the geometry of an equally spaced eight element array antenna, as viewed from the top, which is helpful in understanding the operation of the subject invention.
Figure 4:
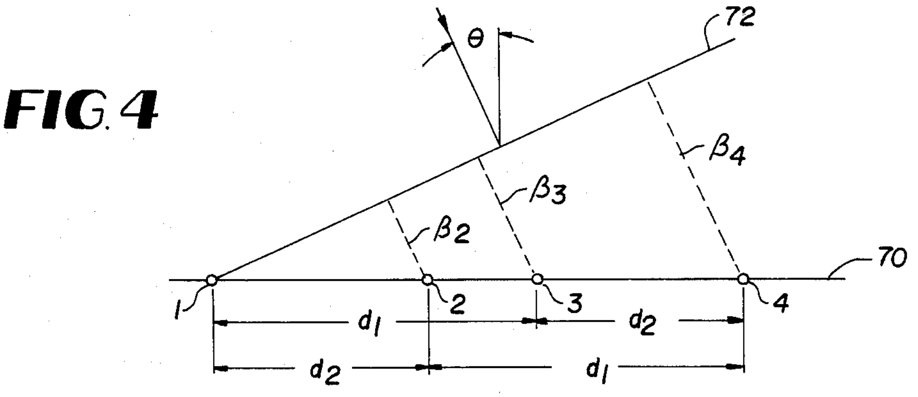
FIG. 4 is a diagram illustrating the geometry of a four element non-uniformly spaced array antenna, as viewed from the top, which is also helpful in understanding the operation of the invention.

In order to more fully understand the principle of independent null tracking by means of the phase control circuitry illustrated in FIGS. 2 and 3, the following analysis considered in light of the diagrams of FIGS. 3 and 4, will now be provided. With reference to FIG. 3, the diagram depicts an eight element linear array comprised of elements 1, 2, . . . 8, and having a uniform spacing d located along an axis 65. A signal wavefront 66 which comprises, for example, the wavefront of an interference signal, arrives at a space angle $\theta$ relative to a line perpendicular to the antenna axis 65. The phase $\beta$ of the received signal at each of the antenna elements 1, 2, . . . 8 is shown by the reference characters $\beta_1, \beta_2 \ldots \beta_8$. Thus, as shown:

$$\beta_1 = 0$$

$$\beta_2 = \frac{2\pi}{\lambda} d \sin\theta = \beta$$

$$\beta_3 = \frac{2\pi}{\lambda} 2d \sin\theta = 2\beta$$

$$\vdots$$

$$\beta_8 = \frac{2\pi}{\lambda} 7d \sin\theta = 7\beta$$

where $\theta$ is the space angle of arrival of wavefront 66 and $\lambda$ is the wavelength. This relationship can thus be expressed mathematically as:

$$\beta_i(i-1)\beta$$

(1)

where $\beta_i$ identifies the phase of the $i_{th}$ element.

Accordingly, controlling the phase of the three sets of phase shifters coupled to the eight element array of FIG. 2 results in a composite signal $e_t$ being provided as an output from the linear adder 64 as follows:

$$e_t = 1 + e^{j\beta}e^{j\phi 3} + e^{j2\beta}e^{j\phi 2} + e^{j3\beta}e^{j\phi 2}e^{j\phi 3} + e^{j4\beta}e^{j\phi 1} + e^{j5\beta}e^{j\phi 1}e^{j\phi 3} + e^{j6\beta}e^{j\phi 1}e^{j\phi 2} + e^{j7\beta}e^{j\phi 1}e^{j\phi 2}e^{j\phi 3} \quad (2)$$

$$= 1 + e^{j(\beta+\phi 3)} + e^{j(2\beta+\phi 2)} + e^{j(3\beta+\phi 2+\phi 3)} + e^{j(4\beta+\phi 1)} + e^{j(5\beta+\phi 1+\phi 3)} + e^{j(6\beta+\phi 1+\phi 2)} + e^{j(7\beta+\phi 1+\phi 2+\phi 3)}$$

Factoring $e^{j(4\beta+\phi 1)}$ from the last 4 terms of equation (2) results in, $$e_t = 1 + e^{j(\beta+\phi 3)} + e^{j(2\beta+\phi 2)} + e^{j(3\beta+\phi 2+\phi 3)} + e^{j(4\beta+\phi 1)}[1 + e^{j(\beta+\phi 3)} + e^{j(2\beta+\phi 2)} + e^{j(3\beta+\phi 2+\phi 3)}] \quad (3)$$

Factoring the first 4 terms then reduces equation (3) to, $$e_t = [1 + e^{j(4\beta+\phi 1)}][1 + e^{j(\beta+\phi 3)} + e^{j(2\beta+\phi 3)} + e^{j(3\beta+\phi 2)+\phi 3)}] \quad (4)$$

Factoring $e^{j(2\beta+\phi 2)}$ from the last 2 terms of the second factored expression in equation (4) then results in, $$e_t = [1 + e^{j(4\beta+\phi 1)}][1 + e^{j(\beta+\phi 3)} + e^{j(2\beta+\phi 2)}\{1 + e^{j(\beta+\phi 3)}\}] \quad (5)$$

which can again be factored using the first 2 terms of the second expression in equation (4) to provide, $$e_t = [1 + e^{j(4\beta+\phi 1)}][1 + e^{j(2\beta+\phi 2)}][1 + e^{j(\beta+\phi 3)}] \quad (6)$$

Equation (6) demonstrates that due to the exponents $\theta_1$, $\theta_2$ and $\theta_3$ in the three terms, each phase control set of the phase shifters shown in FIG. 2 can be separately adjusted to locate and track separate interfering sources with substantially infinite attenuation, i.e., each term in equation (6) can be independently retained at zero for a different space angle $\theta$ by the adjustment and control of the appropriate phase $\phi_i$.

To further demonstrate that same principle of operation obtains for an array antenna having non-uniformly spaced elements, which conforms to the design disclosed in aforementioned U.S. Pat. No. 3,130,410, entitled, "Space Coded Linear Array Antenna", reference will now be made to FIG. 4, wherein there is illustrated a four element array comprising elements 1, 2, 3 and 4 linearly arranged along the axis 70 with an interference wavefront 72 being directed thereto at a space angle $\theta$. The relative spacing of the four antenna elements are shown by the separation distances $d_1$ and $d_2$. More particularly, elements (1 and 3) and (2 and 4) are separated from each other by a distance $d_1$ while elements (1 and 2) and (3 and 4) are separated from each other by distance $d_2$.

Accordingly, at a space angle $\theta$, the phases of the received signal having a wavefront 72 at the four elements are expressed by the following equations:

$$\beta_1 = 0$$

$$\beta_2 = \frac{2\pi}{\lambda} d_2 \sin\theta = \psi_2$$

-continued $$\beta_3 = \frac{2\pi}{\lambda} d_1 \sin\theta = \psi_1$$

$$\beta_4 = \frac{2\pi}{\lambda} (d_1 + d_2) \sin\theta = \psi_1 + \psi_2$$

Utilizing the proposed phase control system shown in FIG. 1 would result in the following received composite signal:

$$e_t = 1 + e^{j\psi 2}e^{j\phi 2} + e^{j\psi 1}e^{j\phi 1} + e^{j(\psi 1+\psi 2)}e^{j\phi 1}e^{j\phi 2} \quad (8)$$

$$= 1 + e^{j(\psi 2+\phi 2)} + e^{j(\psi 1+\phi 1)} + e^{j(\psi 1+\psi 2+\phi 1+\phi 2)}$$

Factoring $e^{j(\Psi 130\ \phi 1)}$ from the last two terms of equation (8) yields, $$e_t = 1 + e^{j(\Psi 2+\phi 2)} + e^{j(\Psi 1+\phi 1)}[1 + e^{j(\Psi 2+\phi 2)}] \quad (9)$$

And factoring out $1+e^{j(\Psi 2+\phi 2)}$ results in $$e_t = [1 + e^{j(\Psi 1+\phi 1)}][1 + e^{j(\Psi 2+\phi 2)}] \quad (10)$$

Equation (10) is comprised of two terms having exponents of $\theta_1$ and $\theta_2$ which demonstrates that control of the phases $\phi_1$ and $\phi_2$ in the phase shifters 10, 12 and 14, 16 of FIG. 1 can be separately adjusted to locate and track two separate interfering sources with substantially infinite attenuation even when the spacing between the elements 1, 2, 3 and 4 is non uniform.

Thus what has been shown and described is a multiple phase control system for a multi-element antenna array which enables multiple interfering sources to be independently acquired, tracked and nulled by independently adjusting the phase of one half the elements for each interference signal to be nulled such that each element has one other element whose phase difference is 180° for the space angle of the arrival of the interfering signal.

Having thus shown and described what is at present considered to be the preferred embodiments of the subject invention, it should be understood that the same has been made by way of illustration and not limitation. Accordingly, all alterations, modifications and changes coming within the spirit and scope of the invention are herein meant to be included.

I claim:

1. An array antenna for cancelling undesired signals received thereby, comprising:

a plurality of antenna elements;

means for varying the phase of signals received by one half of the number of said plurality of antenna elements relative to the other half of said antenna elements in response to a control signal to provide a mutual 180° phase difference between pairs of elements for at least one undesired signal arriving at a certain space angle relative to an axis of said antenna;

receiver means coupled to said antenna elements and including means for detecting and providing an output signal of said undesired signal; and means responsive to the amplitude of said undesired output signal for generating said control signal whereby said phase varying means varies said phase of said received signals by said halves of antenna elements until said 180° phase difference is provided and a corresponding null of said output signal occurs and said undesired signal is thereby cancelled.

2. The array antenna as defined by claim 1 wherein said receiver means and said means for generating said control signal are coupled together in a closed loop control circuit between said antenna elements and said phase varying means for acquiring, tracking and cancelling said at least one undesired signal.

3. The array antenna as defined by claim 2 wherein said means for generating said control signal includes null signal detector means.

4. The array antenna as defined by claim 3 wherein said means for generating a control signal additionally includes signal filter means coupled between said null signal detector means and said phase varying means.

5. The array antenna as defined by claim 1 wherein said phase varying means comprises plural sets of phase varying means respectively coupled to selectively different halves of the number of said plurality of antenna elements relative to respective other halves of the number of said antenna elements for providing a plurality of mutual 180° phase differences between different sets of said antenna elements to cancel a plurality of undesired signals arriving at respective space angles relative to said axis of said antenna; and wherein said means for generating said control signal comprises respective control signal generating means coupled to each said set of phase varying means.

6. The array antenna as defined by claim 5 wherein said receiver means and said respective control signal generating means are coupled to respective sets of phase varying means and said plurality of antenna elements in respective closed circuit tracking loops whereby each loop is operable to independently acquire, track and null a respective undesired signal of a plurality of undesired signals having different space angles of arrival relative to the axis of said antenna.

7. The array antenna as defined by claim 6 wherein said control signal generating means includes null signal detector means.

8. The array antenna as defined by claim 6 wherein said control signal generating means includes respective null signal detector means coupled to each said set of phase varying means.

9. The array antenna as defined by claim 8 and additionally including signal filter means coupled between each said respective null signal detector means and each said set of phase varying means.

10. The array antenna as defined by claim 6 wherein said plurality of antenna elements comprises n elements where n is an integer power of the base 2.

11. The array antenna as defined by claim 10 wherein said integer power comprises a number equal to the number of undesired signals desired to be cancelled.

12. The array antenna as defined by claim 10 wherein said n elements is mathematically expressed as, $$n=2^M$$

where M is the number of undesired signals to be cancelled, and wherein each set of phase varying means comprises n/2 phase shifters respectively coupled to selective ones of n/2 antenna elements.

13. The array antenna as defined by claim 12 wherein said control signal generating means includes null signal detector means.

14. The array antenna as defined by claim 13 wherein said control signal generating means includes respective null signal detector means coupled to each said set of phase varying means.

15. The array antenna as defined by claim 14 and additionally including signal filter means coupled between each said respective null signal detector means and each said set of phase varying means.

* * * * *